INVENTOR
R. A. LOUIS
BY
R. C. Winter
ATTORNEY

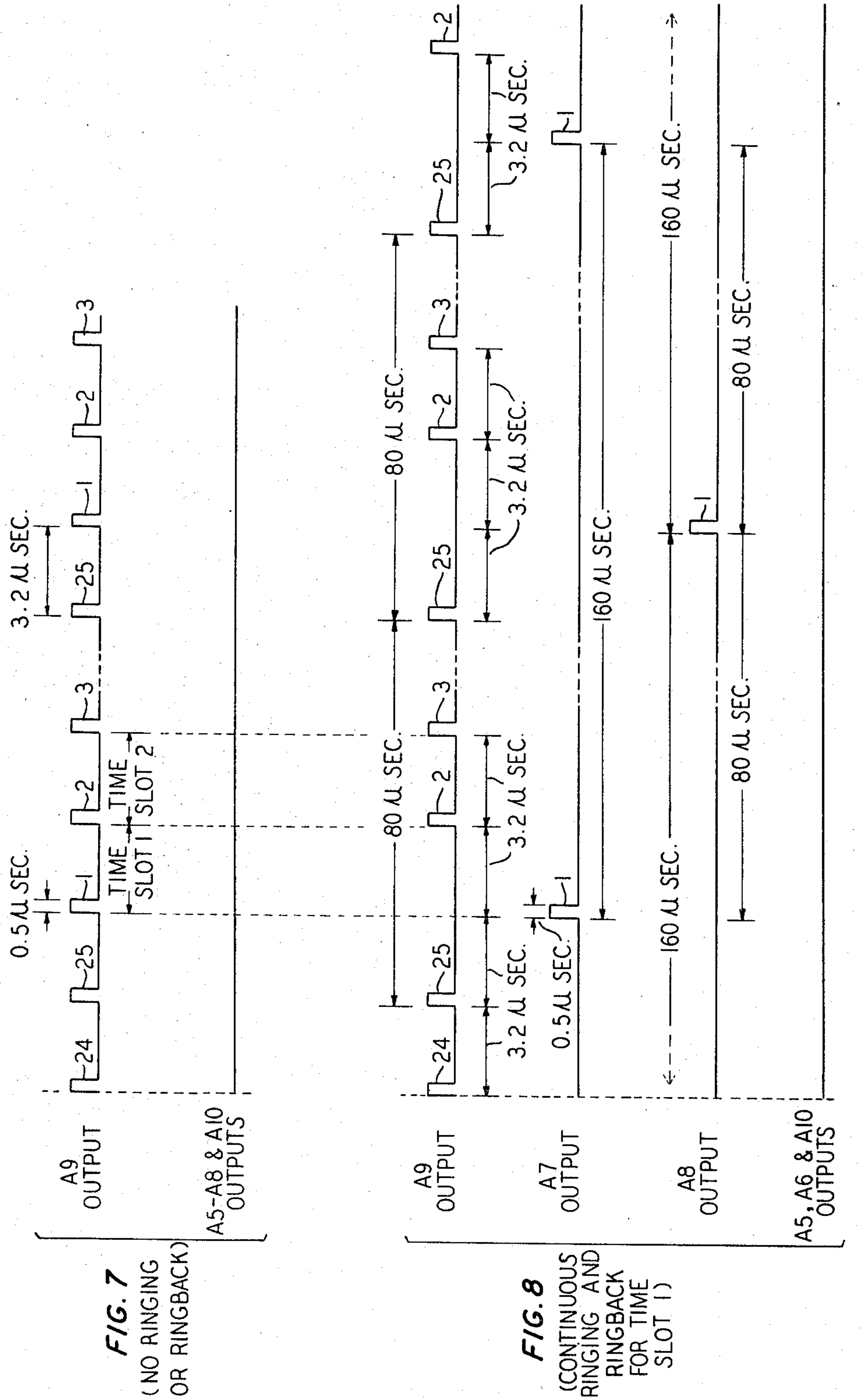
FIG. 7 (NO RINGING OR RINGBACK)
FIG. 8 (CONTINUOUS RINGING AND RINGBACK FOR TIME SLOT 1)

(INTERRUPTED RINGING AND RINGBACK DURING "ON" TIME FOR TIME SLOT 1)

(INTERRUPTED RINGING AND RINGBACK DURING "OFF" TIME FOR TIME SLOT 1)

3,443,033

RINGING ARRANGEMENT FOR TIME DIVISION TELEPHONE SYSTEMS

Ronald A. Louis, Red Bank, N.J., assignor to Bell Telephone Laboratories, Incorporated, New York, N.Y., a corporation of New York Filed Oct. 31, 1963, Ser. No. 320,378
Int. Cl. H01j *3/00;* H04m *3/02*
U.S. Cl. 179—15 11 Claims

ABSTRACT OF THE DISCLOSURE

Ringing arrangements for a time division telephone system are described which prevent overloading of a common ringing source. The time slots of the time division system are divided into a predetermined number of groups. Stations served by time slots of any one group are rung during a corresponding interval of a repeated sequence of time intervals. Immediate ringing independent of the time interval sequence avoids delay in signaling called stations. After the immediate ring interval, ringing signals in accordance with the repeated sequence are applied.

This invention relates to time division switching telephone systems and more particularly to ring and ringback logic circuits for use therein.

In time division switching telephone systems the lines and trunks served are selectively connected to a talking bus in assigned time slots through respective sampling switches and filters. The sampling switch, or gate, associated with each line or trunk is closed to connect the line or trunk to the bus for only a fraction of each office cycle. Two interconnected lines, or an interconnected line and trunk, have their gates operated in the same time slot, and a physical connection is thus completed once in each cycle of operation. The gates thus serve as switches for sampling the continuous waveforms on the two interconnected channels. The essence of time division switching is that sufficient samples completely identify a continuous waveform. The filter connected to each sampling switch smoothes the samples, and in effect serves as a buffer between the continuous waveform on the line or trunk, and the sampled data of the switch.

In time division systems it is not advantageous to apply ringing current for ringing a line directly through the switching network. The ringing signal is of large magnitude, and for the sampling switches and filters to be capable of passing this large magnitude signal, they must be considerably more complex than they need be for transmitting only samples of the relatively small magnitude talking waveforms. To minimize the design criteria of these circuits in some time division systems, such as that disclosed in Patent 3,089,001, issued May 7, 1963, to O. H. Williford, ringing current is not applied through the switching network. Instead, small magnitude ringing control signals are applied to the talking bus by a control circuit. These signals are applied in the time slots assigned to lines which are to be rung. The signals are transmitted through the respective sampling switches where they govern the direct application of a ringing current to the lines to be rung. The ringing control signals are applied only in the time slots serving lines which must be rung.

While the ringing control signals utilized in the above-identified Williford patent govern the application of ringing current to a line, it is also necessary in telephone systems to provide the calling party with a ringback tone. The ringback tone is not of large magnitude, and consequently the ringback signal may be applied directly to the talking bus. The rightback signal may be applied to the talking bus in the time slot assigned to the calling party. Although the switches associated with the calling and called parties may be operated in the same time slot when the parties are connected to each other, prior to this connection they should not be operated simultaneously. The ringing control signals are not required by the calling party, and therefore when they are applied to the talking bus, only the switch associated with the called party should be operated. Also, by not operating the calling party's sampling switch, the calling party cannot interfere with the operation of the called party's line circuit during the ringing operation. Similarly, the ringback signal is not required by the line circuit of the called party, and therefore it should be applied to the talking bus only when the switch of the calling party is operated.

During the ringing operation the ringing control signal and the ringback tone may be applied to the talking bus in the same time slot during alternate office cycles. The called and calling parties' respective sampling switches may be operated in the assigned time slot during the appropriate alternating office cycles as disclosed for example in the copending application of H. S. Feder and G. B. Thomas, Jr., Ser. No. 51,352, filed Aug. 23, 1960, now Patent No. 3,118,019, issued Jan. 14, 1964.

In telephone systems, ring and ringback signals are not supplied continuously to the called and calling parties. Instead, ringing and ringback are applied during a ringing interval followed by a silent interval. In a time division system, if the ringing control signals and ringback tone are to be applied alternately to the talking bus in the assigned time slot, the control circuit which applies the ringing control signals and ringback tone to the talking bus must determine the ringing and silent intervals, and apply the signals to the talking bus only during the ringing intervals. The ringing source itself may be connected directly to the lines through respective line circuits. The connection is normally open, and ringing is applied only in response to the receipt by the respective line circuit of the ringing control signals from the talking bus. A problem with time division switching systems is that if many lines are being rung simultaneously, and if by chance the ringing intervals of all occur simultaneously, the ringing source may be overloaded during the ringing intervals when current must be supplied to all lines which are being rung. Thus in order to avoid overloading the ringing source, it may be necessary to provide a ringing source capable of supplying large instantaneous currents.

It is an object of this invention to provide an improved ring-ringback sequence for a time division switching telephone system.

It is another object of this invention to enable a ringing source of relatively small current rating to provide ringing for all lines served by the time division switching system without being overloaded.

In accordance with one illustrative embodiment of the invention, each ringing interval comprises one unit of time, e.g., one second, and the silent interval comprises three units. The time slots of the system are divided into four groups. Lines having assigned to them time slots in the first group are rung only during the first unit of each four-unit period. The silent interval for these lines comprises the last three units of each four-unit period. Lines having assigned to them time slots in the second group are rung only during the second unit of each four-unit period. The silent intervals for these lines comprise the third and fourth units of each four-unit period, and the first unit of the succeeding periods. Similar remarks apply to lines having assigned to them time slots in the third group, the ringing interval for these lines being the third unit of each four-unit period, and lines having assigned to them time slots in the fourth group, these lines being rung only in the fourth unit of each four-unit period. Thus the ringing source need only supply a maximum instantaneous current sufficient to ring a number of lines equivalent to approximately one-fourth of the total number of time slots. A logic circuit determines when the ringing control signals, which may take the form of time division sampled pulses, and ringback tone are to be applied to the talking bus. This logic circuit governs the application of these signals in the appropriate time slots only during the one unit of each four-unit period during which a line served in a particular time slot may be rung.

If an incoming call, from a line or trunk, is detected and the time slot assigned to the called line is one in the group whose permissible ringing interval has just terminated, the called line cannot be rung for another three units, e.g., three seconds. Staggered ringing may thus result in an appreciable delay before the called party is rung. For this reason I arrange the logic circuit of my invention to also govern the ringing of a called line for one unit immediately upon the detection of the incoming call. Thus the called line is rung and ringback tone is provided to the calling line for a period equivalent to one unit of time independent of the particular unit of time in which these lines would normally be rung. After this one unit of ringing, the ringing control signals and ringback tone are applied to the talking bus only in the interval of permissible ringing for the assigned time slot.

In time division systems, as indicated hereinbefore, it is theoretically possible for incoming calls to be extended to lines in all time slots simultaneously thus overloading the ringing source. The more probable situation, however, is that in which many or all of the possible lines are called during a period of a few seconds. In this case also, were the normal or interrupted ringing not staggered, ringing could be applied to all of the lines simultaneously, i.e., the ringing intervals of all lines could occur concurrently, and the ringing source again would be overloaded. That incoming calls to all of the lines would be detected in the same interval, however, is highly improbable, and for this reason the provision of circuitry to enable any line to be rung immediately for one unit of time when the call is first detected will ordinarily not result in the overloading of the ringing source, while the provision of my circuitry does insure that there will be no delays in ringing a called party.

It is a feature of this invention to insure that the ringing source is not overloaded by providing ringing control signals for any called party in the assigned time slot in only predetermined time intervals.

It is another feature of this invention to provide ringback tone for any calling party in the same time interval during which the ringing control signals are provided for the called party, the ringing control signals and the ringback tone being applied in the same time slot during alternate office cycles.

It is another feature of my invention to apply ringing control signals and ringback tone in the same time slot during alternate office cycles to the talking bus for a predetermined time when an incoming call is first detected independent of the particular interval during which the call is received.

Further objects, features, and advantages of the invention will become apparent upon consideration of the following detailed description in conjunction with the drawing, in which:

FIGS. 5–10 represent the output signals of various gates on FIG. 2 under the conditions particularized below.

*General system description*

Figure 1:
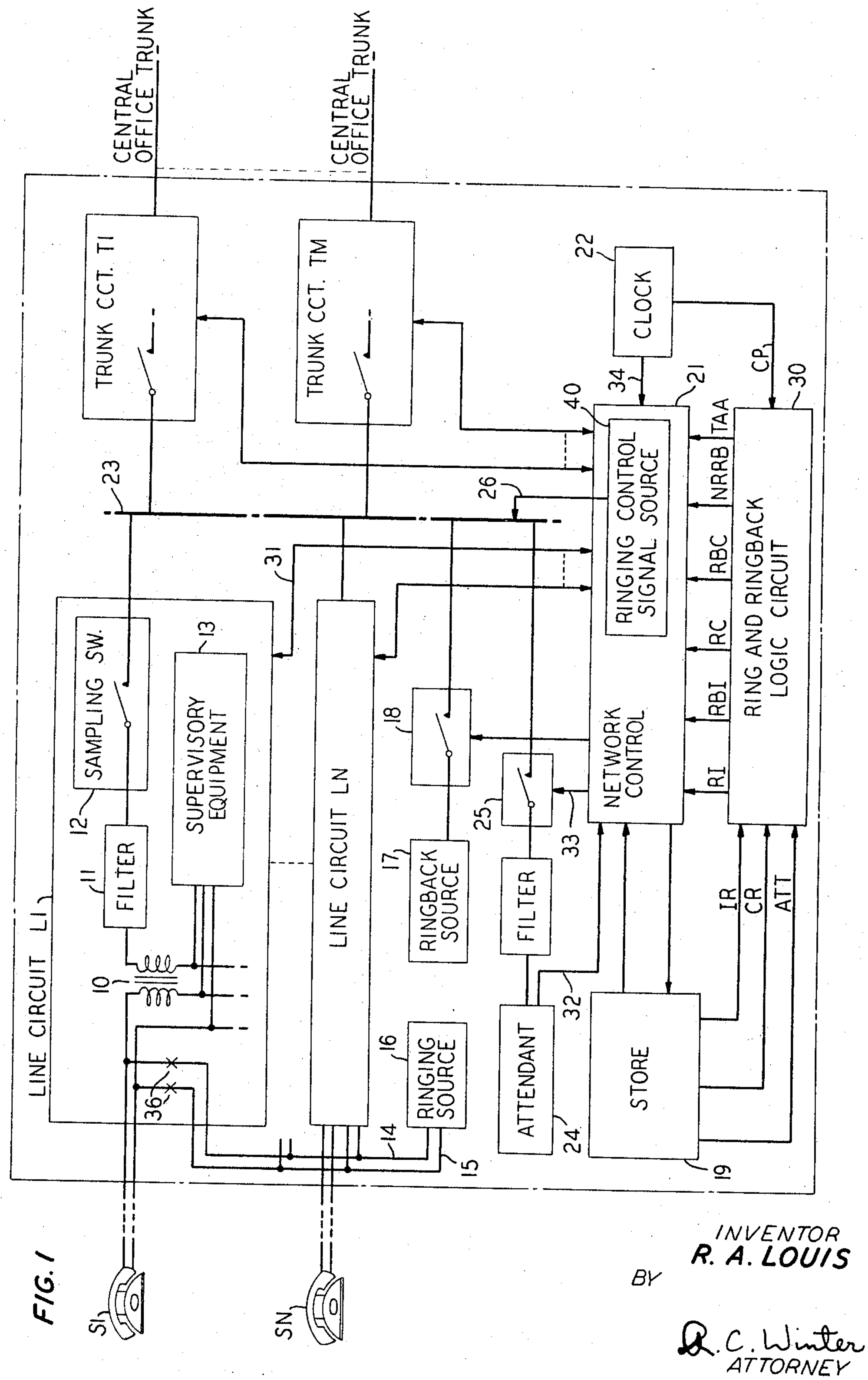
FIG. 1 is an illustrative embodiment of the invention in block diagram form.

FIG. 1 discloses one illustrative embodiment of the invention in the context of a private branch exchange, of the type disclosed in application Ser. No. 252,797 of E. L. Seley et al., filed Jan. 21, 1963, now Patent No. 3,268,669, issued Aug. 23, 1966 employing time division switching. Subsets S1–SN are connected to respective line circuits L1–LN, and the central office trunks are similarly connected to respective trunk circuits T1–TM. Talking bus 23 is connected to all of the line and trunk circuits. Each line circuit is provided with a sampling switch 12 and a filter 11 for establishing a connection between the talking bus and the respective subscriber. A similar sampling switch and filter is included in each of the trunk circuits. Network control 21 governs the operation of all sampling switches in the system. If a particular time slot is assigned to subscriber S1, a signal transmitter from network control 21 to line circuit L1 causes sampling switch 12 to operate in this assigned time slot. In the same time slot another of the line circuit or trunk circuit sampling switches is operated to establish a talking path between a subscriber S1 and another of the PBX subscribers or a central office trunk. Although only samples are transmitted to and from talking bus 23, the filters smooth the samples and provide continuous waveforms on the line and trunk conductors. Included in each line circuit is a transformer 10 for bridging the respective line to talking bus 23, and supervisory equipment 13 for detecting changes in line conditions. Supervisory information and signals, including the signals from the network control 21 for operating sampling switch 12, are transmitted back and forth between line circuit L1 and control circuit 21 over control path 31.

Ringing current in the illustrative embodiment of the invention is not applied through the time division switching network. Instead, when a line is to be rung ringing control signal source 40 applies over conductor 26 ringing control signals to talking bus 23 in the time slot serving the respective line. In this time slot the sampling switch associated with the line is the only one operated, and the ringing control signals are transmitted to the respective supervisory equipment 13. This equipment includes means for closing the two contacts 36 connecting conductors 14 and 15 to the respective tip and ring conductors. When contacts 36 are closed ringing current from source 16 flows through the line to ring the called party. When the answer is detected by supervisory equipment 13 a signal is transmitted over control path 31 to network control 21. The network control no longer applies the ringing control signals to the talking bus in the assigned time slot.

Ringback tone is provided to the calling party by the operation of switch 18 in the same time slot during which the sampling switch of the calling party is operated. The ringback tone from source 17 is transmitted to talking bus 23, and from the bus to the calling party's line or trunk. The ringback tone itself may be transmitted through the sampling switches, as in the Seley et al. system, as it is considerably smaller in magnitude than the ringing signal. Thus there is no need to transmit control signals for the ringback as there is for the ringing.

A PBX attendant may be connected during the ringing operation to a calling party. The attendant 24 notifies network control 21 over control path 32 of the desire to be connected to the calling party. Network control 21 establishes the connection by transmitting a control pulse over conductor 33 to switch 25 in the same time slot that switch 18 is operated. The calling party and the attendant carry on a conversation superimposed on the ringback signal. During the silent intervals of the ringback when switch 18 is not operated in the respective time slot, the control signals are still transmitted to switch 25 to establish a talking path between the attendant and the calling party.

During the ringing intervals the switches of the called and calling parties are operated in the same time slot of alternate cycles, and ringing control signals and ringback tone are applied to the talking bus in these alternate cycles. During the silent intervals the called party's switch is not operated. If the attendant desires to speak with the calling party, however, the latter's switch is operated. The calling party's switch as well as the attendant's is operated in every office cycle, rather than in alternate office cycles, as ringing control signals are not applied during the silent intervals.

There are 25 time slots serving subscribers S1–SN in the illustrative embodiment of the invention. Store 19 contains 25 memory locations. In each of these locations is stored information, in the form of binary bits, pertaining to the call served by a particular one of the 25 time slots, e.g., the identity of the calling party, the identity of the called party, etc. The time slots are sequentially served, and when time slot *i* is served in each office cycle, network control 21 interrogates store 19 to determine what action it should take in this time slot, e.g., which sampling switches should be operated, etc. Network control 21 up-dates store 19 in accordance with supervisory information transmitted to it. At the termination of a call the information in the previously used memory location in store 19 is erased. The associated time slot can now be assigned to another line.

Each time slot has a duration of 3.2 microseconds. There being 25 time slots, the duration of the office cycle is 80 microseconds. That is, each call, of which there may be a maximum of 25, is served by network control 21 once in each office cycle of 80 microseconds. Clock 22 applies a pulse on conductor 34 once every 3.2 microseconds to notify network control 21 to operate upon the call served by the next time slot.

Once a call is established and the calling and called parties are interconnected their respective sampling switches are operated simultaneously in the assigned time slot, once each office cycle of 80 microseconds. Before the called party has answered, however, the two sampling switches are not operated simultaneously. Both switches have assigned to them the same time slot, but network control 21 operates upon them in alternate office cycles under control of ring and ringback logic circuit 30. Each switch thus operates once every 160 microseconds. In a first office cycle the sampling switch of the called party operates, and the ringing control signal is applied over the talking bus to the called party's line circuit. In response to the receipt of this signal ringing current is applied directly to the called line. In the next office cycle it is the calling party's sampling switch which is operated rather than the called party's. At this time the ringback tone is applied to the talking bus. Although the called party's sampling switch is operated only once every 160 microseconds, the supervisory equipment associated with the called party governs the continuous application of ringing current to the called line, since the ringing control signals are smoothed by the line circuit filter. As long as ringing control signals are received once every 160 microseconds, a continuous ringing signal appears on the called line. Similarly, although a sample of the ringback tone is applied to the trunk or line circuit associated with the calling party only once in each 160 microseconds, the filter in the line or trunk circuit smoothes the samples and provides a continuous ringback tone to the calling party. The ringing control signals and ringback samples are applied in the same time slot during alternate office cycles. They are continuously applied for the duration of the ringing interval. After the ringing interval neither ringing control signals nor ringback tone is applied to talking bus 23 in the time slot assigned to the call.

Although each time slot has a duration of 3.2 microseconds a sampling switch is operated for only the first 0.5 microsecond of each time slot. The remaining 2.7 microseconds of each time slot are provided to allow the previously applied signal on talking bus 23 to decay in preparation for the next sample to appear on the bus. Switch 18 is also operated for only 0.5 microsecond, and the ringing control signal applied over conductor 26 by network control 21 also has a duration of only 0.5 microsecond. Switch 25 is also operated for only 0.5 microsecond if the attendant desires a connection to the calling party. This switch is closed during a ringing interval once every other office cycle in the assigned time slot, that is, once every 160 microseconds. It is closed every 80 microseconds during a silent interval.

*Ring and ringback logic circuit—General description*

The various logical operations for determining when the ringing control signals and the ringback tone samples are to be applied to the talking bus are performed by ring and ringback logic circuit 30. This circuit is provided with four inputs and six outputs. A memory location in store 19, which corresponds to a time slot, contains the information pertaining to the call served by that time slot—including IR bit and CR bit positions. The CR bit, if energized, that is, if a 1 is written in the CR bit position, represents a continuous ring requirement. This bit indicates that the time slot being served has been assigned to a call in which dialing was completed no longer than one time unit ago. In the illustrative embodiment of the invention the basic time unit is one second. The line must therefore be rung and ringback be supplied to the calling party in the time slot being served, whether or not the second during which the action is taking place is one in which interrupted ringing and ringback may be provided for the time slot being sampled. The IR bit, if energized, represents an interrupted ring requirement. A 1 in the IR bit position indicates that the line has already been rung continuously for one second, and is now to be rung on an interrupted basis in the assigned time slot. Network control 21 initially writes a 1 in the CR bit position when the completion of dialing is first detected. After one second of ringing, network control 21 erases the CR bit stored in store 19, and instead writes a 1 in the IR bit position. This IR bit is maintained until the called party answers. At this time network control 21 updates store 19 by erasing the IR bit. Thereafter, in that time slot a 1 appears in neither the IR nor CR bit positions. The logic circuit is thus notified that neither ringing nor ringback need be provided. Similarly, if the time slot being serviced is not assigned to a call the IR and CR bits are both 0's. The logic circuit is again notified that no ringing or ringback action is necessary.

The third input to logic circuit 30 is an ATT bit. If the memory location in store 19 corresponding to the time slot being served contains a 1 in the ATT bit position, the attendant's switch 25 must operate together with that of the calling party to establish the attendant connection.

The fourth input to logic circuit 30 is a clock pulse on conductor CP. This pulse has a duration of 0.5 microsecond. Although each time slot has a duration of 3.2 microseconds it is only during the first 0.5 microsecond that a ringing control signal or ringback tone, if necessary, is to be applied to talking bus 23 by network control 21.

The six output conductors of the logic circuit are energized, if at all, for the first 0.5 microsecond of each time slot. An output on conductor RC represents a continuous ring command. That is, an output signal on this conductor notifies network control 21 that for the duration of the output, 0.5 microsecond, the called party served by the time slot under consideration is to be rung; ringing control signals are to be applied to the talking bus and the sampling switch of only the called party is to be operated. The signal on conductor RC further indicates that the ringing requirement is a result of dialing having been completed within the previous one second, and that the ringing is to be supplied even though the present time is not one during which a line served by the time slot under consideration is normally rung. A signal on output conductor RBC notifies the control circuit to apply ringback tone to the calling party, that is, to operate switch 18 and the sampling switch of the calling party rather than the called party. This signal further indicates to network control 21 that the ringback signal is to be applied even though the present time may not be one during which ringback is normally provided to a calling party served in the present time slot. The signals on conductors RC and RBC appear in alternate office cycles. In a first 80 microsecond office cycle, a 0.5 microsecond pulse appears on conductor RC, and the ringing control signals are supplied to the called party. Eighty microseconds thereafter a 0.5 microsecond pulse appears on conductor RBC, and another ringback sample is provided to the calling party. In the next office cycle another 0.5 microsecond pulse appears on conductor RC, etc. The ringing control signals and the ringback tone samples are thus each applied to talking bus 23 once every 160 microseconds during a continuous ringing interval.

A 0.5 microsecond pulse on conductor RI represents an instruction to the network control 21 that ringing is again to be supplied to the called party. The signal on conductor RI, rather than conductor RC, notifies the network control that the one second of continuous ringing has already elapsed, and that the called party is now being rung only in the one second of permissible ringing for the time slot being serviced. A similar pulse on conductor RBI represents an instruction to the network control to apply ringback tone to the calling party, the calling party having already been supplied with immediate ringback for one second, and now being provided ringback only in the permissible second of ringing and ringback for the time slot being serviced. The pulses on conductors RI and RBI alternate, a pulse appearing on each conductor once every 160 microseconds. Conductors RI and RBI are analogous to respective conductors RC and RBC. A pulse on either of conductors RI or RC notifies network control 21 to apply a 0.5 microsecond ringing control signal over conductor 26 to talking bus 23. A pulse on conductor RBI or RBC notifies the network control to close switch 18 for 0.5 microsecond to provide the calling party with ringback tone. Although conductors RI and RC thus convey the same information to the network control, and although conductors RBI and RBC similarly convey the same information to the network control, different conductors are provided depending on whether or not the time slot under consideration is serving a call in which dialing was completed within the last second. The network control may require this information for other purposes. For example, although the network control initially stores a CR bit in store 19, it may erase this bit and substitute in its stead the IR bit only after pulses are received over conductors RC and RBC for one second, the network control including a timing mechanism for determining when these pulses have been received for one second, in dicating that store 19 must be up-dated.

A pulse on conductor NRRB indicates that ringing and ringback requirements do not exist for the present time slot. This condition arises when neither an IR nor a CR bit is present in store 19, that is, either the time slot is assigned to no call, or it is assigned to a call in which the calling and called parties are already talking to one another. An IR bits results in alternating 0.5 microsecond pulses on conductors RI and RBI every 80 microseconds, every fourth ringing interval second. This sequence continues until the called party answers. At this time pulses appear continuously on conductor NRRB every 80 microseconds in the particular time slot as the called party has answered and ringing and ringback signals are no longer required.

The sixth output conductor, conductor TAA, is energized whenever an attendant connection to the calling party being served in the present time slot is to be established. The connection is established only if the attendant notifies the network control over path 32 of the identity of the calling party requiring the connection. In this event network control 21 writes a 1 bit in the ATT position of the respective memory location in store 19. This information bit enables the ring and ringback logic circuit 30 to pulse conductor TAA whenever the attendant's sampling switch is to operate simultaneously with the switch of the particular party. Network control 21 operates switch 25 together with the sampling switch of the calling party for 0.5 microsecond each time a pulse appears on conductor TAA. A pulse appears on conductor TAA only when the calling party's sampling switch may be operated, i.e., every 160 microseconds during a ringing interval and every 80 microseconds during a silent interval. The attendant-calling party connection is established during both ringing and silent intervals. During a ringing interval the attendant and the calling party hear the ringback tone. During the silent intervals they do not. The pulses on conductor TAA thus appear continuously every 160 or 80 microseconds until the called party answers.

*Ring and ringback logic circuit—detailed description*

Figure 2:
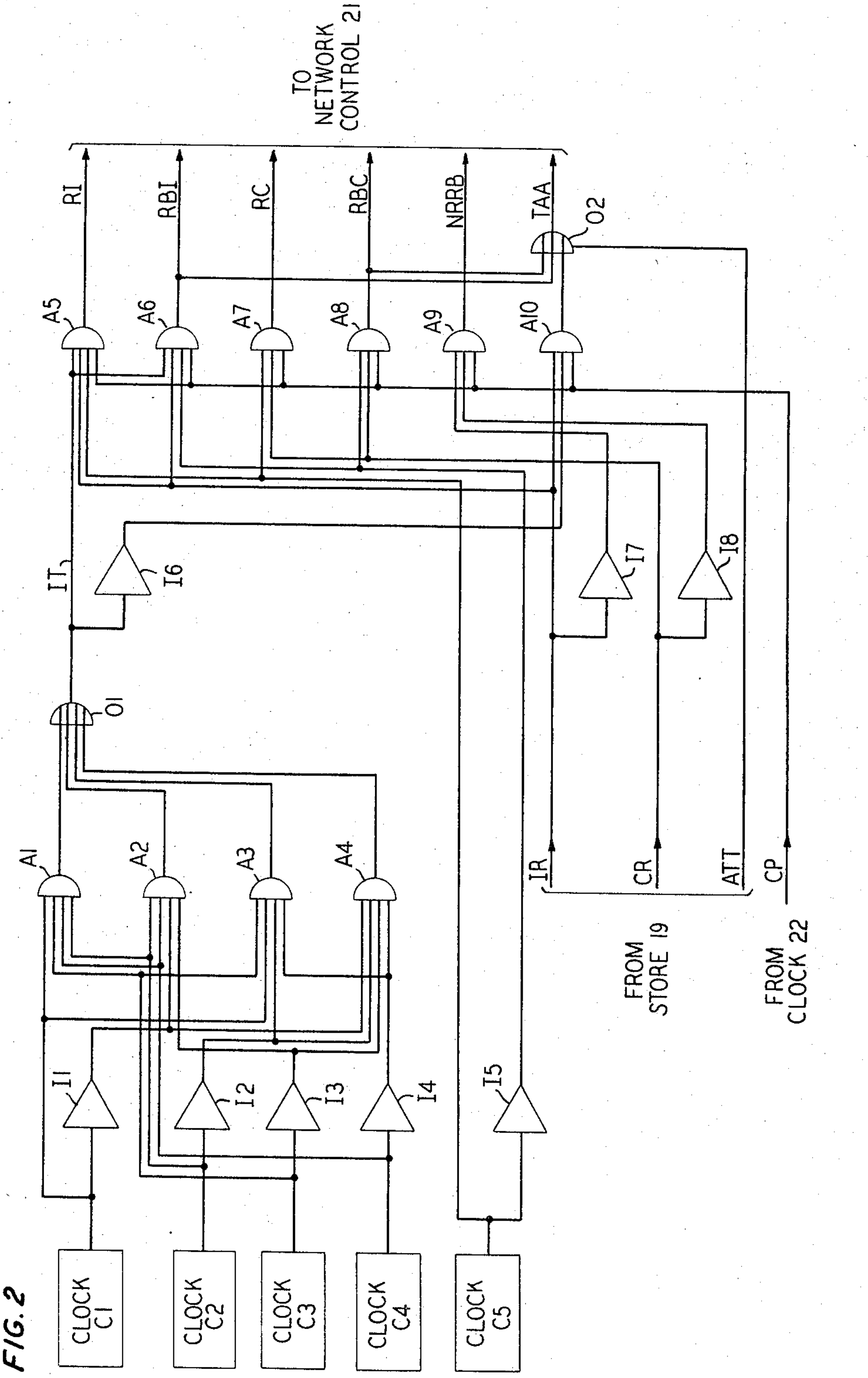
FIG. 2 is a more detailed representation of the ring and ringback logic circuit 30 of FIG. 1.

FIG. 2 is a more detailed representation of the ring and ringback logic circuit 30. The four inputs to this circuit, three from store 19 and one from clock 22, are shown on the lower left hand portion of the figure. The six output conductors to network control 21 are shown on the right hand portion of the drawing.

The circuitry comprising clocks C1–C4, inverters I1–I4, AND gates A1–A4, and OR gate O1 produces an output pulse on conductor IT if the present time is one of permissible ringing and ringback for the time slot being serviced. A pulse appears on conductor IT if the present time is within a one second interval when interrupted ringing and ringback can be applied to lines served by the time slot being processed. A pulse on conductor IT does not necessarily result in the application of ringing or ringback tone. If the time slot does not have an IR bit, interrupted ringing and ringback tone are not required. Similarly, the absence of a pulse on conductor IT does not necessarily preclude the application of ringing control signals or ringback tone to the talking bus. A CR bit may be present in store 19 for the time slot being processed, indicating that ringing or ringback is to be supplied even though the present time is not one when these signals would be applied for the time slot being processed were an IR rather than a CR bit present in store 19. A pulse on conductor IT only indicates that if an IR bit is present in store 19 for the present time slot ringing or ringback should be applied at this time.

The outputs of each of clocks C1 and C2 are applied directly to two of the four AND gates A1–A4, and through the inverters to the other two. The output waveforms of these clocks are shwon in FIG. 3. Clock 1 supplies a positive pulse for the duration of every other time slot, except that in two successive time slots, time slot 25 of one cycle and time slot 1 of the next, a positive pulse is continuously supplied. Clock 2 supplies positive pulses for the duration of every other pair of time slots, with the exception that a continuous positive pulse is supplied for each time slot 25, and the next two in succession. Each of the AND gates has one of its inputs connected either directly or through an inverter to clock C1, and another input similarly connected to clock C2. At any time only one of the four AND gates has both of its C1 and C2 inputs energized. This is the only gate which may operate, provided that the other two inputs are similarly energized.

In time slot 1 the outputs of both clocks C1 and C2 are positive, and as both are connected directly to AND gate A1 this gate conducts provided its other two inputs are energized. In time slot 2 the output of clock C1 is not energized. Inverter I1 supplies an energizing pulse to an input of each of gates A2 and A4. As clock C2 now applies a positive output to gate A2, but not to gate A4, gate A2 operates if its other two inputs are energized. In time slot 3 only gate A3 has both of its C1 and C2 inputs energized, and similar remarks apply to gate A4 in time slot 4. In time slot 5 the cycle begins again, and gate A1 operates if its other two inputs are energized. The cycle continues until gate A4 has both of its C1 and C2 inputs energized in time slot 24. Gate A1 then has its C1 and C2 inputs energized during both time slot 25 of one office cycle, and time slot 1 of the next.

Figure 4:
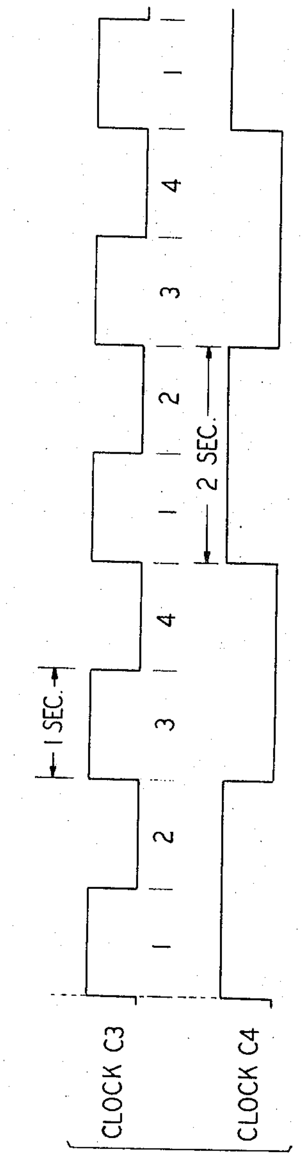

The output waveforms of clocks C3 and C4 are shown in FIG. 4. These waveforms are applied to the inputs of the AND gates in a manner similar to that in which the waveforms of clocks C1 and C2 are applied. Thus, in the first second of operation both of the C3 and C4 inputs of only gate A1 are energized. In the second second, both of the C3 and C4 inputs of only gate A2 are energized, etc.

Figure 5:
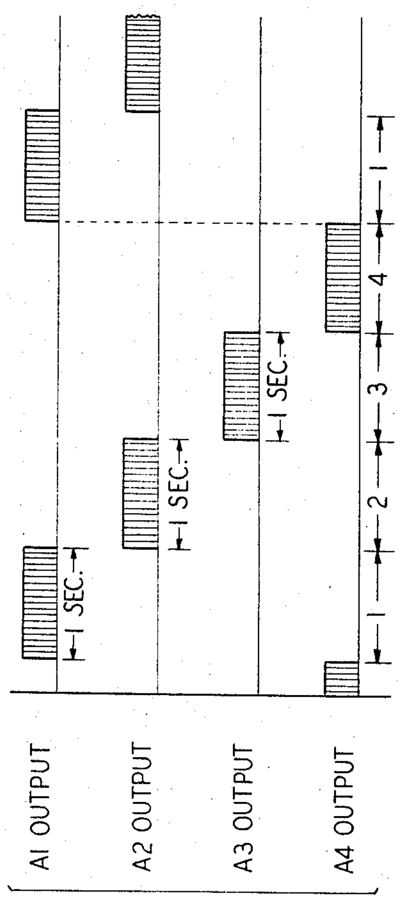
Figure 6:
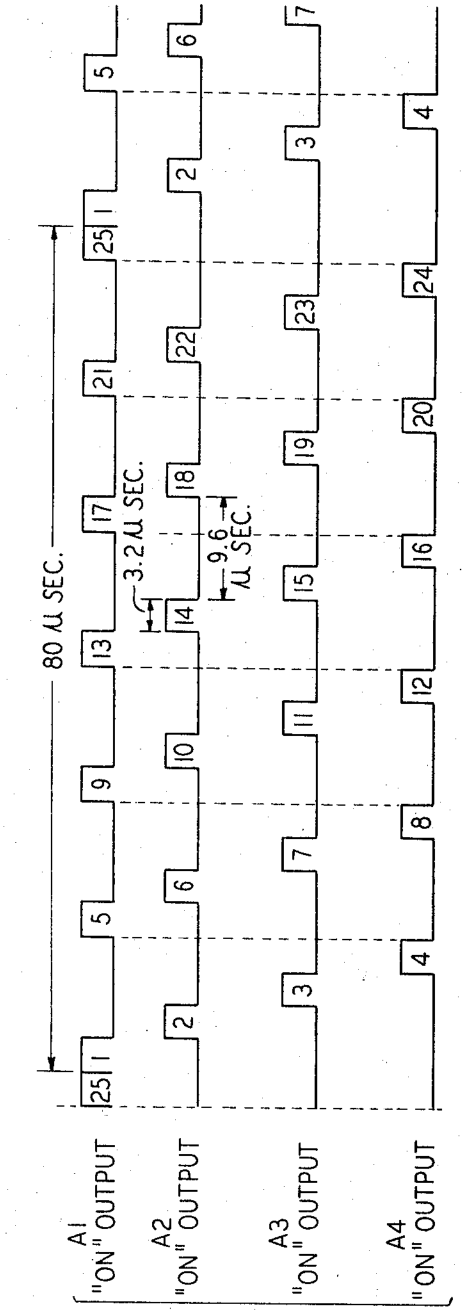

The resulting operations of gates A1–A4 are shown in FIG. 5, and in more detail in FIG. 6. During the first second of system operation, as shown on FIG. 5, only gate A1 can conduct. However, the gate does not conduct continuously during this second. As shown in FIG. 6 the gate conducts, or is on, only during time slots 1, 5, 9, 13, 17, 21 and 25, i.e., when the two inputs connected to clocks C1 and C2 are both energized. During the second second of operation only gate A2 conducts. Again, the gate does not conduct continuously, but only does so when time slots 2, 6, 10, 14, 18 and 22 are being serviced. Similar remarks apply to gate A3, the third second of system operation, and time slots 3, 7, 11, 15, 19 and 23; and gate A4, the fourth second of system operation, and time slots 4, 8, 12, 16, 20 and 24.

The 25 time slots are divided into four groups. The first group comprises time slots 1, 5, 9, 13, 17, 21 and 25, a total of seven time slots. Each of the other three groups comprises six time slots each, group 2 comprising time slots 2, 6, 10, 14, 18 and 22, group 3 comprising time slots 3, 7, 11, 15, 19 and 23, and group 4 comprising time slots 4, 8, 12, 16, 20 and 24. Ringing and ringback are provided for the called and calling parties served in time slots in the first group only during the first, fifth, ninth, etc., seconds of the telephone system operation. The starting point in this timing scheme is arbitrary, and the division of time into successive periods of four seconds each begins when the system first goes into operation. Ringing and ringback are provided for calling and called parties served by time slots in the second group only during the second, sixth, tenth, etc., seconds of systems operation. Similar remarks apply to the third and fourth groups of time slots, and the third, seventh, eleventh, etc., seconds of systems operation, and the fourth, eighth, twelveth, etc., seconds of systems operation. The ringing interval is thus one second, and the silent interval is three seconds for all lines. In the event that incoming calls have been placed in all twenty-five time slots, during a first second of operation only the seven called lines served by time slots in group 1 are rung. During the second of system operation only the six lines in group 2 are rung. Similar remarks apply to the six lines served by the time slots in each of groups 3 and 4 in the third and fourth seconds. In the fifth second, again, only the seven lines in group 1 are rung. Thus a maximum of only seven lines are instantaneously connected to ringing source 16. Of course, if during the permissible ringing second for group 1 only time slot 13 is assigned to a line to be rung only one line is connected to ringing source 16. The purpose of the staggered ringing is to insure that even under the most adverse conditions, i.e., all 25 time slots are serving calls for which ringing is to be supplied, a maximum of only seven lines are connected to ringing source 16 at any one instant.

As ringback is supplied in the same time slot of alternate office cycles to the calling parties served by the time slots in group 1 during only the first, fifth, ninth, etc., seconds of system operation, it is apparent that during the first, fifth, ninth, etc., seconds of systems operation a maximum of only seven lines or trunks are provided with ringback. In the second through fourth, sixth through eighth, etc., seconds of systems operation a maximum of only six lines or trunks are provided with ringback.

As described above this staggered ringing and ringback sequence could result in a delay of three seconds in establishing a call. For example, if a call is made to subscriber S1, and time slot 6 is assigned to the call, in the event the call is detected ten seconds after the system is first put into operation subscriber S1 could not be rung for another three seconds. Because time slot 6 is in group 2, and called parties served by time slots in group 2 cannot be next rung until the beginning of the 14th second of system operation, three seconds must elapse before the ringing control signals may be applied to talking bus 23 in time slot 6. For this reason network control 21 governs the application of the ringing control signals and the ringback tone in time slot 6 of alternate office cycles for one second immediately when the call is first detected. Only thereafter are the ringing control signals and ringback tone applied in the permissible second of ringing and ringback. Thus subscriber S1 is rung and ringback is provided to the calling party in the 11th second of system operation, even though this is not a second permissible ringing and ringback for a call served in time slot 6. After this one second of immediate ringing and ringback, the interrupted ringing control signals and ringback tone are applied in time slot 6 of alternate office cycles in the 14th, 18th, etc., seconds of system operation until the called party answers. Similar remarks apply to a call served by any of the other 24 time slots. Ringing and ringback are provided immediately when the incoming call is detected, whether or not it is detected in a second of permissible ringing or ringback for the assigned time slot.

The outputs of the four gates A1–A4 are all connected to inputs of OR gate O1, the OR gate operating when any one of the AND gate outputs is energized. Conductor IT is thus energized whenever time slots 1, 5, 9, 13, 17, 21 and 25 are serviced in the first, fifth, ninth, etc., seconds of system operation. In the second, sixth, tenth, etc. seconds of system operation conductor IT is energized only when time slots 2, 6, 10, 14, 18 and 22 are serviced. In the third, seventh, eleventh, etc., seconds of system operation conductor IT is energized only when time slots 3, 7, 11, 15, 19 and 23 are serviced, and in the fourth, eighth, twelfth, etc. seconds of system operation conductor IT is energized only when time slots 4, 8, 12, 16, 20 and 24 are serviced. The four-second cycle repeats itself with pulses appearing on conductor IT in only particular time slots within each one second interval. The pulses on the IT conductor control the interrupt ring and ringback timing. Lines served by time slots in group 1 are rung only during the first, fifth, ninth, etc., seconds of system operation if an IR bit is present in call store 19 for these time slots. Similarly, lines served by time slots in groups 2, 3 and 4 are rung only in the respective permissible seconds of ringing. The over-all result is that during the first, fifth, ninth, etc., seconds of system operation a maximum of seven lines, those served in time slots 1, 5, 9, 13, 17, 21 and 25, may be connected to ringing source 16 due to respective IR bits being stored in call store 19. As the other three groups of time slots each comprises only six time slots, at all other times a maximum of only six lines may be connected to the ringing source simultaneously due to the interrupted ring requirements represented by respective IR bits in call store 19.

Figure 3:
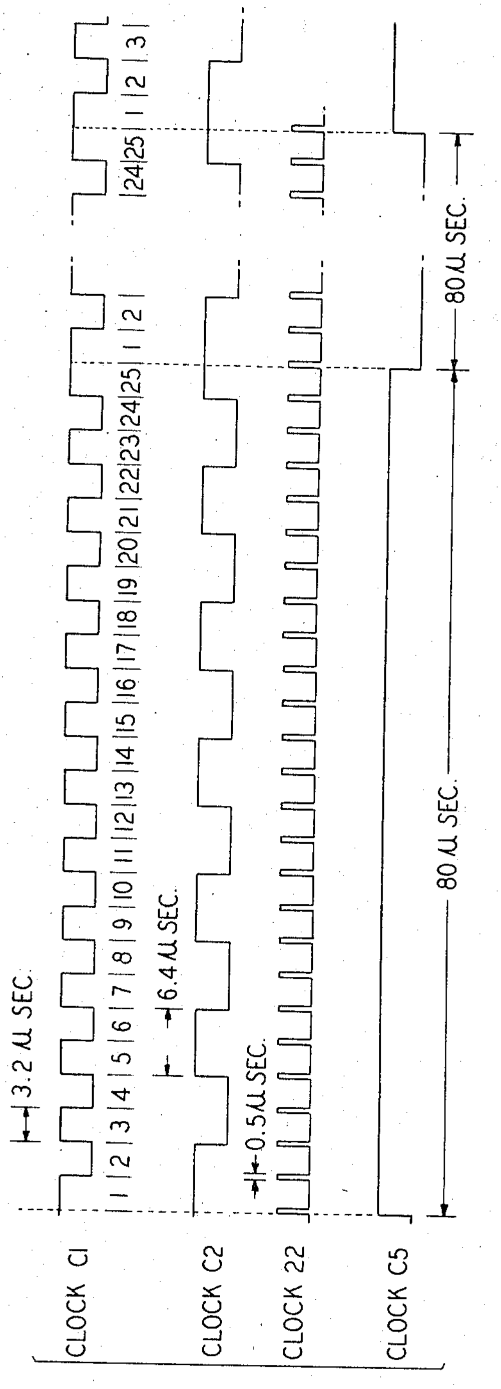
FIGS. 3 and 4 represent the output signals of clocks C1–C5 on FIG. 2, and clock 22 on FIG. 1.

The clock 22 pulses on conductor CP are shown in FIG. 3. Each clock pulse has a duration of 0.5 microsecond and occurs at the beginning of a time slot. On FIG. 2, one input of each of AND gates A5–A10 is connected to conductor CP, and thus the AND gates, if enabled, are operated only in the first 0.5 microsecond of any time slot. Similar remarks apply to the operation of OR gate O2, as the three inputs to this OR gate have durations of only 0.5 microsecond. Thus the six output conductors to control circuit 21 carry pulses of only 0.5 microsecond duration when energized. The various switches in FIG. 1 are closed for only 0.5 microsecond in order that any signal applied to talking bus 23 decay in the last 2.7 microseconds of a time slot prior to the succeeding time slot at which time another signal may be applied to the talking bus. As a clock pulse is applied to one input of all the AND gates A5–A10 on FIG. 2, the particular operation of each of these gates depends upon its various connections to conductors IT, IR, CR, and clock C5.

The output waveform of clock C5 is shown in FIG. 3. A positive pulse of 80 microseconds duration is first supplied, followed by a negative pulse of the same duration. As each of the 25 time slots has a duration of 3.2 microseconds the polarity of the output of clock C5 switches after each office cycle. The output of clock C5 is connected directly to one of the inputs of gates A5 and A7. The inverted output is connected to one of the inputs of gates A6 and A8.

Considering just the operations of gates A5–A8, it is seen that gates A5 and A7 are the only two which may operate during a first office cycle, and gates A6 and A8 the only two which may operate during a second office cycle. The outputs of gates A5 and A7 represent the continuous ring and interrupted ring instructions. Ringing control signals may be applied to the talking bus only in every other office cycle. The outputs of gates A6 and A8 represent interrupted ringback and continuous ringback instructions. Ringback tone may be applied to the talking bus only in the remaining alternate office cycles.

The third inputs of each of gates A7 and A8 are connected to the CR conductor. If for a particular time slot continuous ringing and ringback are to be provided, the CR conductor is energized each time the time slot is serviced. In the first office cycle gate A7 operates when the particular time slot is serviced, all three inputs of the gate being energized. In the next office cycle, because of the output of inverter I5 is energized rather than the output of clock C5, gate A8 operates when the same time slot is serviced. During the first 0.5 microsecond of the time slot in the second office cycle, ringback tone is applied to the talking bus rather than ringing control signals.

Three of the input connections of gates A5 and A6 are similar to the three input connections of respective gates A7 and A8: All four gates are connected to the clock pulse conductor CP. Gates A5 and A7, operating when ringing control signals are to be applied, are connected to the output of clock C5, and gates A6 and A8, operating when ringback tone is to be applied to the talking bus, are connected to the inverted output of clock C5. Gates A5 and A6 which operate when the ringing or ringback arises from an IR bit being stored in the call store are connected to conductor IR, and gates A7 and A8 which operate when the ringing and rinback arises from a CR bit being stored in the call store are connected to conductor CR. The additional input terminals of gates A5 and A6 are connected to the IT conductor. There is no equivalent connection for gates A7 and A8 as these gates operate when the time slot being serviced requires ringing or ringback independent of the interrupted timing. Analogous gates A5 and A6, however, operate only if the present time is one during which interrupted ringing or ringback may be supplied, i.e., during the one second of each four-second cycle of permissible ringing.

For example, consider that ringing and ringback are to be provided on an interrupted basis to the called and calling parties served in time slot 1. During a first office cycle the three input terminals of gate A5 connected respectively to clock C5, conductor IR, and conductor CP are energized when time slot 1 is serviced. The input connected to conductor IT, however, is energized only if the present time is within the first, fifth, or ninth, etc. second of system operation. If the present time is within any other second of system operation gate A5 does not operate. Similar remarks apply to the operation of gate A6, 80 microseconds later.

Gate A9 operates when neither ringing nor ringback requirements exist for the particular time slot being serviced. As ringing and ringback requirements are represented by either an IR or CR bit, gate A9 must operate only when neither bit is present in the call store. The outputs of both inverters I7 and I8 are energized when neither bit is stored in the call store for the particular time slot being processed. Two of the inputs of gate A9 are connected to the inverter outputs. The third input to gate A9 is from clock 22. Thus when a particular time slot is not assigned to a call or is assigned to one in which the two parties are already connected in a talking state, a 0.5 microsecond pulse appears on conductor NRRB.

*Detailed description of attendant connection*

Conductor TAA is energized whenever an attendant connection is to be established. Network control 21 operates switch 25 only if the attendant 24 desires the connection, the network control first being notified of the request over control path 32 and writing a 1 in the ATT position of the appropriate memory location in store 19. Thereafter, a pulse on conductor TAA instructs network control 21 to operate switch 25.

Switch 25 is operated only when a calling party's sampling switch is operated, i.e., once every 160 microseconds during a ringing interval, and once every 80 microseconds during a silent interval. Whenever one of conductors RBI or RBC is energized, indicating that ringback tone is to be applied to the talking bus in the present time slot together with the operation of a calling party's sampling switch, a pulse must appear on conductor TAA, if the present time slot is one during which the attendant is to be connected to a calling party. If ringback tone is not being applied to the calling party, switch 25 may operate once every office cycle rather than once every other office cycle in any particular time slot. If ringback tone is not being applied to the talking bus 23 neither are the ringing control signals. Consequently, the ringing control signals and the attendant-calling party conversation can not interfere with each other, and a pulse may appear on conductor TAA to operate switch 25 and the switch of the calling party once every office cycle in the particular time slot assigned to the call. Gate A10 operates during the silent intervals when ringback and ringing are not applied, and pulses do not appear on conductors RBI and RBC. Gate A10 is not controlled by clock C5, and in this manner may operate every office cycle if its three inputs are energized. As the input connected to the CP conductor is energized in each time slot, gate A10 operates if the other two inputs are energized. A first one of these inputs is connected to conductor IR. The IR bit represents an interrupted ringing requirement for the particular time slot being served. As the attendant's connection is established prior to the answering of the call by a called party gate A10 is controlled by an input representing the fact that ringing is in progress. A pulse appears on conductor IR whenever the time slot is served during the interrupted ringing period, and thus gate A10 operates if its third input, connected to the output of inverter I6, is energized. During the one second ringing interval a pulse appears on conductor RBI once every 160 microseconds to control the attendant-calling party connection. During the three second silent interval no pulse appears on this conductor, nor of course on conductor RBC as the interrupted one second ringing and ringback interval is over. Gate A10 is operated to permit the above connection during this three second silent interval. During this period, and each time the particular time slot is served, no pulse appears on conductor IT. Consequently, the output of inverter I6 is energized and gate A10 operates. The net result is that during the one second of continuous ringing and ringback the attendant-calling party connection is made in the particular time slot once in every other office cycle, as a result of a pulse appearing on conductor RBC. During the one second of ringing and ringback in the interrupted ringing sequence this connection is controlled once every other office cycle, as a result of a pulse appearing on conductor RBI. During the three second silent interval, when ringing control signals are not applied to the talking bus in every other office cycle, the connection is made in each office cycle, as a result of the operation of gate A10. In this manner a maximum number of operations of switch 25 is achieved.

Although the operation of any one of gates A6, A8 and A10 controls the attendant connection by energizing conductor TAA through OR gate O2, this conductor should be energized only if the attendant connection is required. This requirement is evidenced by the ATT bit, and OR gate O2 is enabled only if conductor ATT is energized. If the ATT bit is a 0, conductor TAA is not energized and switch 25 is not operated. Only if the ATT bit is a 1 is conductor TAA energized, and the sampling switches of the attendant and the calling party operated.

*No ringing or ringback required*

FIG. 7 represents the output waveform on conductor NRRB when ringing and ringback are not required for any lines in the system. This situation arises when no lines are being served by the 25 time slots, or when all subscribers being served are already engaged in conversations and do not require ringing. Neither IR nor CR bits are energized in any time slot. As one of these two conductors is connected to each of gates A5–A8 these gates do not operate during any time slot, the IR and CR bits not being present for any of the 25 time slots. The IR conductor is connected to an input of AND gate 10, and this gate similarly does not operate. OR gate O2 also remains off as its three inputs are unenergized during each time slot. Only gate A9 operates, the gate operating for 0.5 microsecond at the beginning of each time slot. The inverted outputs from store 19 are two of the inputs to this gate, the clock pulse being the third. As all three inputs are energized, gate A9 operates for 0.5 microsecond at the beginning of each time slot as shown in FIG. 7. A 0.5 microsecond pulse appears at the beginning of each time slot. Each pulse on conductor NRRB notifies network control 21 that ringing control signals and ringback tone are not required for the present time slot, and that the calling and called party sampling switches may be operated simultaneously if the time slot is being used for a call.

*Initial continuous ring*

FIG. 8 illustrates the various output waveforms when a CR bit is stored in the store 19 for a particular time slot. It is assumed in FIG. 8 that 24 of the 25 time slots either serve no lines, or are assigned to lines having no ringing requirements. Only time slot 1 serves a called party which is to be rung, and a calling party for which ringback tone must be provided. Furthermore, the ringing and ringback requirements have resulted from the detection by network control 21 of the identity of the called party within the last one second. The CR bit is present in store 19 for only one second after the network control determines the identity of the called party.

A pulse appears on conductor NRRB for all time slots except the first for the same reason that it appeared during all time slots in FIG. 7. Only when time slot 1 is served is the CR conductor energized. The output of inverter I8 is thus unenergized and gate A9 does not operate. In each office cycle of 80 microseconds a pulse appears on conductor NRRB at the beginning of each time slot. Only during time slot 1 is this pulse absent. The absence of the pulse, however, is not sufficient for notifying network control 21 of what action it should take. The network control must be further notified as to whether ringing control signals or ringback tone is to be applied to the talking bus, and whether the ringing or ringback requirement has resulted from the presence of an IR or a CR bit in store 19 for the time slot being serviced.

In a first office cycle when the output of clock C5 is positive gate A7 operates during time slot 1. Gate A7 operates only during time slot 1 as it is only when this time slot is serviced that the CR conductor is energized. There is no CR bit associated with the other 24 time slots, and consequently a pulse appears on conductor RC to notify the network control to apply the ringing control signals to the talking bus only during time slot 1. In the next office cycle of 80 microseconds the inverted clock C5 output is energized, and at this time gate A8 rather than A7 operates in time slot 1. This gate does not operate when the other 24 time slots are serviced as no CR bits are associated with these time slots. A pulse appears on conductor RBC in the second office cycle only during time slot 1. This pulse notifies the network control to apply ringback tone to the talking bus, the ringback requirement having resulted from the presence of a CR bit in store 19 for time slot 1. During the second office cycle gate A7 does not operate even during time slot 1 as its clock C5 input is unenergized. Gates A7 and A8 operate during time slot 1 in alternate office cycles. Ringing control signals are applied to the talking bus every 160 microseconds. Similarly, ringback tone is applied to the talking bus every 160 microseconds. During the other 24 time slots in each office cycle neither signal is applied to the talking bus.

Gates A5, A6 and A10 are not energized as an IR bit is not present in the call store for any of the 25 time slots, including time slot 1. No pulses appear on conductors RI and RBI. As gate A10 does not operate at all when the existing conditions are those on which the waveforms of FIG. 8 are based, OR gate O2 operates only when a pulse appears on conductors RBC every 160 microseconds, if conductor ATT is energized. The attendant, if she has notified network control 21 that she desires to be connected to the calling party served by time slot 1, is connected to the calling party over the talking bus every other office cycle during time slot 1 as determined by the output RBC. Identical output waveforms appear on conductors RBC and TAA. Sampling switch 25 is operated simultaneously with the sampling switch serving the calling party in time slot 1 of every other office cycle.

*Grouped interrupted ringing and ringback*

Figure 9:
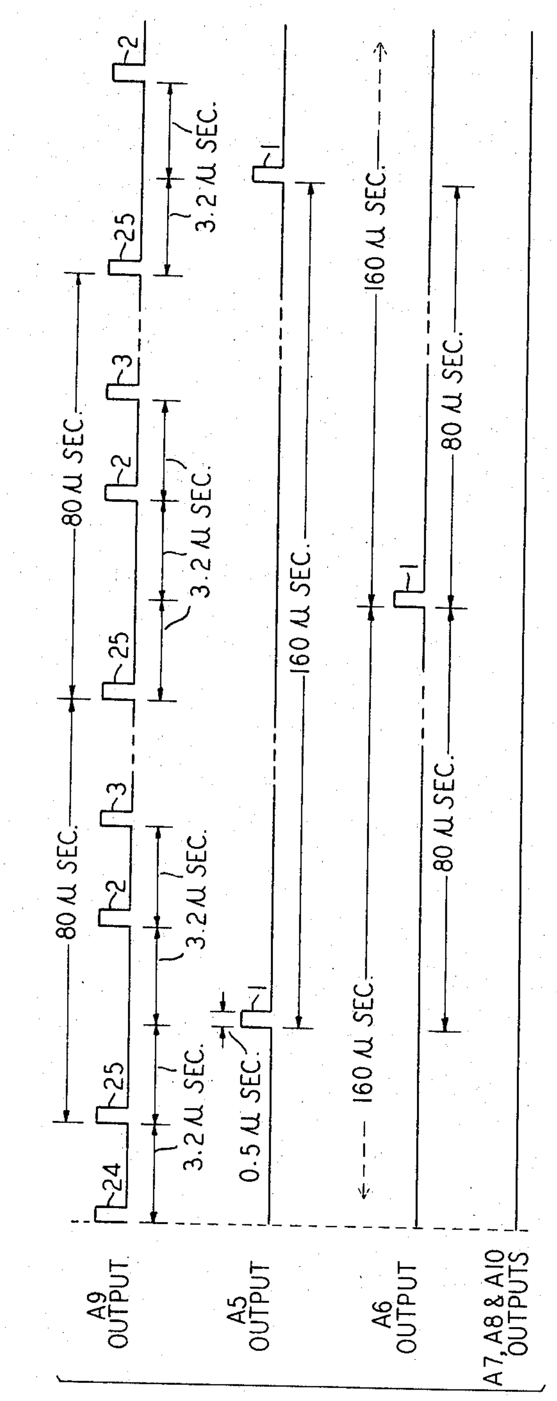
Figure 10:
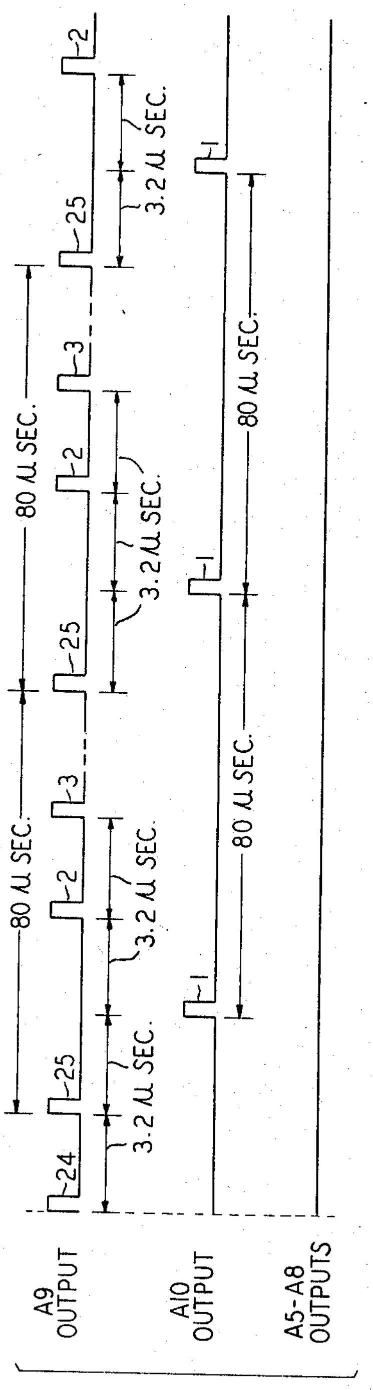

FIGS. 9 and 10 illustrate the various output waveforms when interrupted ringing and ringback requirements exist, again only for time slot 1. It is assumed that the called party has not answered during the first second of ringing. Pulses have alternately appeared on conductors RC and RBC every 80 microseconds in time slot 1 for a time interval of one second. At this time network control 21 up-dates store 19 by erasing the CR bit associated with time slot 1, and instead writing into store 19 an IR bit for the same time slot. The IR bit is an indication that although ringing control signals and ringback tone are still to be provided in alternate time slots when time slot 1 is serviced, these signals are to be applied only in the one second in each group of four of permissible ringing and ringback.

FIG. 9 shows the various output waveforms during the "on" time for time slot 1, that is, during the one second of permissible ringing and ringback for time slot 1. During this one second a pulse appears on conductor IT when time slots 1, 5, 9, 13, 17, 21 and 25 are served. Thus, during time slot 1 one of the inputs for each of gates A5 and A6 is energized. Because of the presence of the IR bit during time slot 1 another of the inputs of each of gates A5 and A6 is energized during time slot 1. Each of these gates has a clock pulse input which is also energized. The gates operate in time slot 1 in alternate office cycles, however, because they are connected to different outputs of clock C5. Pulses thus alternately appear on conductors RI and RBI every 80 microseconds, a pulse appearing on each conductor every 160 microseconds. In a first office cycle a pulse on conductor RI notifies network control 21 to apply ringing control signals to the talking bus in time slot 1, as a result of the presence of an IR bit in the call store for this time slot. In the next office cycle the pulse on conductor RBI instructs the network control to apply ringback tone to the talking bus in time slot 1, again as a result of the presence of an IR bit in store 19 for this time slot. Gates A5 and A6 do not operate when any of the other 24 time slots are served. Neither an IR nor a CR bit is present in store 19 for any of these time slots, and gates A5 and A6, an input of each being connected to conductor IR, do not operate when the other 24 time slots are processed.

Gates A7 and A8 do not operate in any time slot. These gates are controlled by the CR bit, and as none of the 25 time slots have associated with them CR bits gates A7 and A8 do not operate at all.

Gate A9 operates when all time slots, other than time slot 1, are serviced as both outputs of inverters I7 and I8 are energized at these times. Only when time slot 1 is serviced and the output of inverter I7 is unenergized does gate A9 not operate. The pulses on conductor NRRB when 24 of the 25 time slots are serviced notify network control 21 that neither ringing nor ringback is required. The absence of a pulse on conductor NRRB in time slot 1 notifies the control that the calling and called parties' sampling switches are not to be operated simultaneously.

Gate A10 does not operate even during time slot 1. When the other 24 time slots are serviced the IR bit is not present and gate A10 does not operate. When time slot 1 is served the IR bit is present. However, during the one second of on time for time slot 1 a pulse appears on conductor IT whenever time slot 1 is serviced. As the output of inverter I6 thus inhibits gate A10, the gate does not operate during time slot 1. As gates A10 and A8 do not operate in any time slot, when the existing conditions are those assumed in FIG. 9, gate O2 operates only when a pulse appears on conductor RBI provided a 1 appears on conductor ATT. Gate O2 thus operates in time slot 1 in every other office cycle. A pulse appears on conductor TAA to operate sampling switch 25, if the attendant has notified the network control of her request to talk to the calling party served by time slot 1, at the same time that a pulse on conductor RBI notifies the network control to apply ringback tone to the talking bus and to operate the calling party's sampling switch.

It should be noted that the output waveforms in FIGS. 8 and 9 are identical except that in FIG. 8 gate A7 operates rather than A5 and gate A8 operates rather than gate A6. During the one second of permissible interrupted ringing and ringback for time slot 1 the control circuit governs the system operation in the same manner as it does when continuous ringing and ringback are required. The only difference in the various outputs is that when continuous ringing and ringback are required conductors RC and RBC are energized, and when interrupted ringing and ringback are required conductors RI and RBI are energized.

FIG. 10 illustrates the outputs of gates A5–A10 when time slot 1 is serviced during the three second silent interval for this time slot. None of gates A5–A9 operate during time slot 1. Gate A9 operates during the other 24 time slots. Gate A10 operates whenever time slot 1 is served.

When time slots 2–25 are processed gates A5 and A6 do not operate as their IR inputs are not energized. During time slot 1 although the IR inputs are energized, the IT inputs are not as no pulses appear on conductor IT in time slot 1 during the three second silent interval for this time slot. Gates A7 and A8 also do not operate during any of the 25 time slots as no CR bit is present in store 19 for any of the 25 time slots. Gate A9 operates during time slots 2–25 as neither IR nor CR bits are present for these time slots. A pulse on conductor NRRB during these time slots indicates that no action is required by network control 21 insofar as ringing, ringback, and the attendant's connection are concerned. When time slot 1 is serviced however, the IR conductor is energized. As gate A9 is inhibited by the absence of an output pulse from inverter I7 no pulse appears on conductor NRRB. The absence of a pulse on conductor NRRB notifies the network control that the calling and called parties' sampling gates are not to be operated simultaneously and that some further action is required. This further action is not ringing or ringback as none of gates A5–A8 operate. However, a pulse does appear on conductor TAA if conductor ATT is energized, to notify network control 21 to establish the attendant's connection to the calling party. A pulse appears on conductor TAA because gate A10 and the ATT pulse operate OR gate O2. During time slot 1 the IR conductor is energized. A second input of gate A10 has applied to it a clock pulse. The third input is connected to inverter I6. During the three second silent interval for time slot 1 no pulse appears on conductor IT when time slot 1 is serviced. Consequently, the output of inverter I6 is energized at this time. Gate A10 thus operates once each office cycle, and a pulse appears on conductor TAA in time slot 1 once in each office cycle if the ATT bit is present to enable OR gate O2. This pulse notifies the network control to establish the attendant's connection. Sampling switch 25 and the calling party's sampling switch are operated in time slot 1 in every office cycle, rather than in every other office cycle as they are when continuous ringing is required or during the ringing interval of interrupted ringing. During the three second silent interval no ringing control signals are applied to the talking bus in alternate time slots 1. As a result the attendant and calling party may be connected to each other whenever time slot 1 is served, i.e., once in each office cycle rather than once in every other office cycle.

Thus, the staggered interrupted ringing of the invention insures that the ringing source will not be overloaded. The provision of continuous ring and interrupted ring bits ensures that a called party is signaled as soon as his identity is detected by the network control. Although the invention has been described with reference to a specific embodiment, it is to be understood that this embodiment is only illustrative of the application of the principles of the invention and various modifications may be made therein without departing from the spirit and scope of the invention.

What is claimed is:

1. In a time division telephone system, a plurality of lines, a talking bus, gating means for connecting each of said lines to said bus in selectively assignable time slots, a source of ringing signals, a source of ringing control signals, means responsive to said ringing control signals for connecting said source of ringing signals to individual of said lines, and a control circuit for controlling the application of said ringing control signals to said talking bus in time slots assigned to lines requiring ringing, said control circuit comprising means for assigning each of said time slots to a particular unit of time of a plurality of repetitive time units, means responsive to said assigning means for causing said ringing control signal responsive means to connect said source of ringing signals to said line only in said particular unit of time, and means for initially causing said ringing control signal responsive means to connect said source of ringing signals to said line requiring ringing regardless of the assignment of time unit to the time slot serving said line.

2. In a time division switching system having a plurality of time slots selectively assignable to a plurality of lines, a talking bus and a source of ringing control signals; a logic circuit for controlling the application of said ringing control signals to said talking bus in time slots assigned to lines requiring ringing comprising first means for governing the application of said ringing control signals to said talking bus in a time slot assigned to a line when said time slot is first assigned to said line and second means for governing the application of said ringing control signals to said talking bus in said time slot occurring in only predetermined time units after said first governing means has operated for a preselected time unit.

3. In a time division switching system the combination in accordance with claim 2 further having a source of rinkback tone, and means for applying said ringback tone to said talking bus in time slots assigned to lines requiring ringback, means included in said logic circuit for controlling the serving of said lines requiring ringing and said lines requiring ringback in the same time slot in alternate office cycles, and means included in said logic circuit for controlling the application of said ringback tone to said talking bus in the same time slot in alternate office cycles during said preselected time unit and during said predetermined time units.

4. In a time division switching system in accordance with claim 3 further having an attendant's position selectively connectable to said talking bus, means included in said logic circuit for controlling the connection of said attendant's position to said talking bus in a selected time slot whenever said ringback tone controlling means is operated and in said selected time slot in successive office cycles in time units other than said predetermined time units.

5. In a time division switching system, a plurality of lines, a talking bus, means for connecting a pair of said lines to said bus in a selected time slot of a repetitive cycle of $n$ time slots, means for applying ringback tone to said bus in said selected time slot in one cycle, means for applying a time division sampled ringing control pulse to said bus in said selected time slot in the cycle succeeding said one cycle, means for defining a repetitive sequence of $n$ time slots divided into $k$ groups, and means for enabling said connecting and applying means so as to limit the application of said sampled ringing control pulse and said ringback tone to $1/k$ of $n$ lines during any one of $k$ units of time.

6. A time division switching system comprising a plurality of lines, a common link, means for connecting activity pairs of said lines to said link in corresponding selected time slots of a repetitive cycle of time slots, a ringing signal source, means in one of said lines operative in response to a time division sampled ringing control pulse received from said link in the assigned time slot for connecting said source to the corresponding line, means for applying said sampled ringing control pulse to said link in said assigned time slot only in alternate cycles, means for defining a plurality of time intervals, means for associating a distinct group of said time slots with each of said plurality of time intervals, and means for confining the time of application of said sampled ringing control pulse for a selected group of said time slots to one of said plurality of time intervals.

7. A time division switching system in accordance with claim 6, and further comprising means operative upon the initial assignment of a time slot to a pair of lines for enabling said applying means and the corresponding connecting means concurrently irrespective of said confining means.

8. A time division switching system according to claim 7, and further comprising means for applying ringback tone to said link in said assigned time slot in cycles in which the sampled ringing control pulse is not applied.

9. A time division switching system comprising a plurality of lines selectively connectable in respective assigned time slots of a repetitive cycle of time slots to a talking bus, clock means defining a plurality of groups of repetitive time intervals, each of said time intervals extending over a plurality of said cycles, and means connected to and responsive to said clock means for producing time division sampled pulses to control the concurrent ringing of all extensions in a predetermined sequence of said groups of repetitive time intervals, said sampled pulses being operative to restrict the ringing of each of said extensions to only a predetermined one of said groups of repetitive time intervals associated with said assigned time slot.

10. A time division switching system comprising a common bus, a plurality of lines each connected to at least one extension, said lines being selectively connectable to said common bus in assigned time slots of a repetitive cycle of time slots, means for applying time division sampled control pulses to said common bus, clock means for defining a plurality of repetitive time units, means for associating a plurality of groups of said time slots each with one of said repetitive time units, and means responsive to said associating means for controlling the operation of said pulse applying means in any assigned time slot only at times included in the repetitive time units associated with said assigned time slot, said pulse applying means being operative to apply ringing signals concurrently to all extensions in a predetermined sequence of said repetitive time units.

11. A time division switching system comprising a common bus, a plurality of lines selectively connectable to said common bus in assigned time slots, means for applying control signals to said common bus, clock means for defining a plurality of repetitive time units, means for associating a plurality of groups of time slots each with one of said repetitive time units, means responsive to said associating means for controlling the operation of said signal applying means in any time slot only at times included in the repetitive time units associated with said slot, and means for controlling the operation of said pulse applying means in any time slot when said time slot is first assigned to an extension for a predetermined time independent of the operation of said associating means.

References Cited

UNITED STATES PATENTS

| | | | |
|---|---|---|---|
| 3,281,538 | 10/1966 | Harding | 179—15 |
| 3,118,019 | 1/1964 | Feder et al. | 179—15 |
| 3,050,589 | 8/1962 | Vaughn | 179—15 |
| 1,701,073 | 2/1929 | Harbecke | 179—84 |
| 1,251,504 | 1/1918 | Goodrum | 179—18.82 |
| 2,971,060 | 2/1961 | Vaughan | 179—18 |
| 3,059,058 | 10/1962 | Abbott | 179—18.82 |
| 3,160,712 | 12/1964 | Osborn | 179—15 |

RALPH D. BLAKESLEE, *Primary Examiner.*

U.S. Cl. X.R.

179—18.82, 84